US008532275B2

(12) United States Patent
Mello et al.

(10) Patent No.: US 8,532,275 B2
(45) Date of Patent: Sep. 10, 2013

(54) CLOUD-BASED VIRTUAL TANDEM

(75) Inventors: Brenton A. Mello, Denver, CO (US);
John Ward, Johnstown, CO (US)

(73) Assignee: IntelePeer, Inc., San Mateo, CA (US)

( * ) Notice: Subject to any disclaimer, the term of this patent is extended or adjusted under 35 U.S.C. 154(b) by 117 days.

(21) Appl. No.: 13/192,753

(22) Filed: Jul. 28, 2011

(65) Prior Publication Data

US 2011/0299673 A1 Dec. 8, 2011

Related U.S. Application Data

(63) Continuation-in-part of application No. 12/729,806, filed on Mar. 23, 2010, now Pat. No. 8,155,291.

(60) Provisional application No. 61/388,872, filed on Oct. 1, 2010.

(51) Int. Cl.
H04M 15/00 (2006.01)

(52) U.S. Cl.
USPC ............ 379/115.03; 379/114.01; 379/121.06

(58) Field of Classification Search
USPC ............ 379/114.01, 115.01, 115.03, 121.02, 379/121.06
See application file for complete search history.

(56) References Cited

U.S. PATENT DOCUMENTS

| | | | |
|---|---|---|---|
| 6,005,926 A | 12/1999 | Mashinsky | |
| 6,292,481 B1 | 9/2001 | Voit et al. | |
| 6,335,927 B1 | 1/2002 | Elliot et al. | |
| 6,636,590 B1 | 10/2003 | Jacob et al. | |
| 6,658,099 B2 | 12/2003 | Perkins, III | |
| 7,050,555 B2 * | 5/2006 | Zargham et al. | 379/115.01 |
| 7,050,788 B2 | 5/2006 | DeLoach et al. | |
| 7,224,781 B2 | 5/2007 | Jacob et al. | |
| 7,453,998 B2 | 11/2008 | Jacob et al. | |
| 7,995,723 B2 | 8/2011 | Jacob et al. | |
| 2002/0136167 A1 | 9/2002 | Steele et al. | |
| 2006/0008064 A1 * | 1/2006 | Sangillo | 379/114.08 |
| 2007/0061397 A1 | 3/2007 | Gregorat et al. | |
| 2012/0257617 A1 * | 10/2012 | Bugenhagen et al. | 370/352 |

FOREIGN PATENT DOCUMENTS

| | | |
|---|---|---|
| JP | 06-253021 | 9/1994 |
| JP | 09-172508 | 6/1997 |
| JP | 2002-344664 | 11/2002 |
| JP | 2003-250007 | 9/2003 |
| JP | 2006-067584 | 3/2006 |
| JP | 2007-074059 | 3/2007 |
| JP | 2009-533958 | 9/2009 |
| KR | 100850109 B1 | 7/2008 |
| WO | 02/27599 A1 | 4/2002 |

* cited by examiner

Primary Examiner — Quoc D Tran
(74) Attorney, Agent, or Firm — DLA Piper LLP (US)

(57) ABSTRACT

Peering partners register with a peering grid for direct broadband routing of call offers. The peering grid terminates call offers on behalf of peering partners, collecting call detail records, summarizing termination usage, and calculating a payment to be provided to the peering partner in return for using the services of the peering grid. A call detail record may be generated for the peering partner, which may include a market value of call traffic, a variable cost of the call traffic, and a determined compensation amount. The market value is based on revenue for terminations of the call traffic from the peering grid, the variable cost is a function of sharing the market value between the peering grid and the peering partner, and the compensation amount due is a function of the variable cost.

8 Claims, 3 Drawing Sheets

CLOUD-BASED VIRTUAL TANDEM

RELATED APPLICATIONS

This application is a continuation-in-part of U.S. application Ser. No. 12/729,806, entitled "Payment System for Paying Peering Partners in a Telecommunications Network," filed on Mar. 23, 2010, and claims priority to Provisional Application No. 61/388,872, entitled "Virtual Tandem," filed on Oct. 1, 2010, the contents of which are incorporated herein in their entirety.

TECHNICAL FIELD

The subject matter of this application is generally related to telecommunications.

BACKGROUND

Call termination, or voice termination, relates to the transfer of telecommunications sessions (e.g., telephone calls, data, image, or multimedia transfer, etc.) from one telecommunications exchange to another. The telecommunications exchange, in some examples, can include a telecommunications carrier such as a competitive local exchange carrier (CLEC) or an incumbent local exchange carrier (ILEC), or a telecommunications service provider. The call initiator resides at the originating point, and the call destination resides at the terminating point.

The originating telecommunications exchange can elect to transfer the telecommunications session to a terminating telecommunications exchange. The terminating telecommunications exchange, in some implementations, advertises a cost related to termination services. For example, the originating telecommunications exchange can choose to transfer the telecommunications session to a terminating telecommunications exchange which advertises the lowest cost termination services or lowest cost rate (LCR).

In some implementations, the terminating telecommunications exchange includes a different network type than the originating telecommunications exchange. The network can include, in some examples, packet-switched data networks (e.g., the Internet, intranets, extranets, subnets), the public switched telephone network (PSTN), wireless networks, local area networks (LANs), wide area networks (WANs), peer-to-peer networks, satellite networks, radio and television broadcast networks, optical networks, metro area networks (MANs), computer networks, grid networks, exchanges (e.g., private branch exchange (PBX)), broadband integrated data services network (B-ISDN), access networks, digital subscriber lines (DSL), cable, etc. The terminating telecommunications exchange can be selected by the originating telecommunications exchange, in part, due to the type of destination communications device (e.g., the style network the communications device is adapted to use). The communication devices can include any device capable of transmitting or receiving voice and/or data, including but not limited to: telephones, smart phones, mobile phones, personal digital assistants (PDAs), computers, FAX machines, Internet-enabled devices, media players, set-top boxes, email devices, etc. For example, the originating telecommunications exchange may be a public switched telephone network (PSTN), while the terminating telecommunications exchange may be a voice over internet protocol (VoIP) broadband network, or vice-versa.

Call detail records are generated upon termination of a telephone connection. The information within the call detail records can be used by a telecommunications provider to determine proper billing charges for services rendered. A call detail record can contain, in some examples, the originating telephone number, the receiving telephone number, an origination timestamp, and the call duration. Additionally, the telecommunications provider can collect other information within call detail records, such as a record identification code, the result of the call (e.g., completed, busy, etc.), specific routing information regarding the call, or special features used during the call (e.g., call waiting, conference line, etc.).

Billing charges typically include termination services charged by the terminating telecommunications exchange that are based on a fixed cost per minute compensation structure. This results in the terminating telecommunications exchange receiving the same per minute rate from an originating telecommunications exchange or from a third-party carrier regardless of the rate that the originating telecommunications exchange or the third-party carrier is collecting from its customer (i.e., the originating caller). The terminating telecommunications exchange basically relies on accurate self-reporting from the originating telecommunications exchange or the third-party carrier. Moreover, typical compensation structures only take into account long distance charges, so that the terminating telecommunications exchange is not compensated for local calls. This may be especially problematic when the terminating telecommunications exchange is a wireless carrier as tracking of long distance versus local communication sessions is difficult.

Thus, an improved compensation structure that provides transparency and maximum value for terminating telecommunications exchanges is desired.

SUMMARY

Peering partners register with a peering grid for direct broadband routing of call offers. The peering grid terminates call offers on behalf of peering partners, collecting call detail records, summarizing termination usage, and calculating a payment to be provided to the peering partner in return for using the services of the peering grid.

In an embodiment, a method of generating a call detail record for a terminating carrier includes determining a market value of call traffic to a terminating carrier over a predetermined time period, determining a variable cost of the call traffic, and determining a compensation amount due to the terminating carrier. The market value is based on revenue for terminations of the call traffic from a peering grid to the terminating carrier, the variable cost is a function of sharing the market value between the peering grid and the terminating carrier, and the compensation amount due is a function of the variable cost. A report is created that includes one or more of the determined market value, the determined variable cost, and the determined compensation amount.

DETAILED DESCRIPTION

Example Telecommunication Peering Grid

Figure 1:
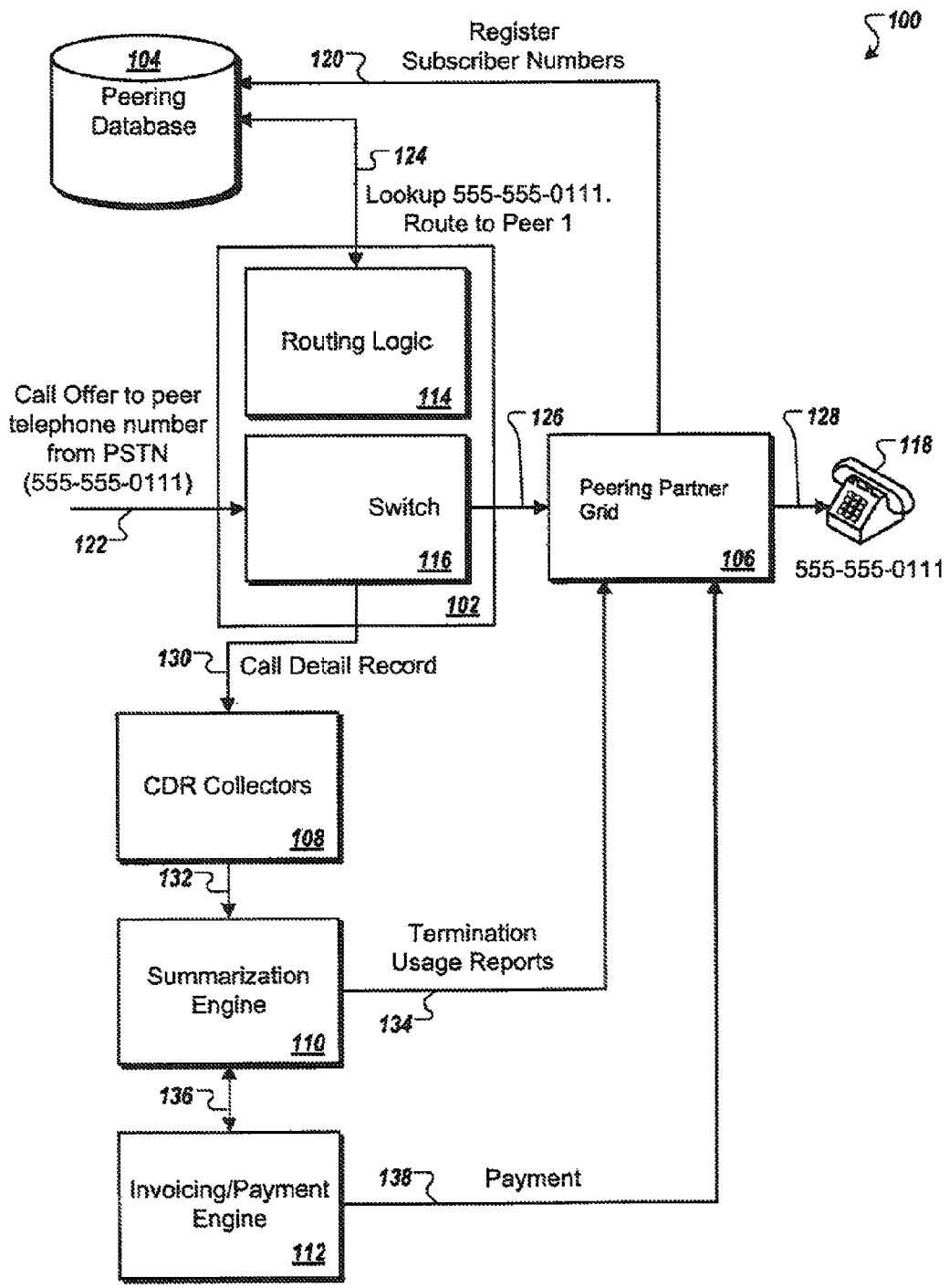
FIG. 1 is a block diagram of an example telecommunications peering grid for facilitating call connections to peering partners and generating payment information for peering partners.

FIG. 1 is a block diagram of an example telecommunications peering grid 100, such as a Media Peering Grid™, for facilitating call connections to peering partners and generating payment information for peering partners. In some implementations, the telecommunications grid 100 includes a peering infrastructure 102, a peering database 104, and a peering partner grid 106.

The peering infrastructure 102 can provide peering partners with direct broadband routing of telecommunications calls from the peering infrastructure to the peering partner access equipment. In some implementations, peering partners can include organizations which have many telephone numbers such as, in some examples, corporate enterprises, educational campuses, telecommunications carriers, telecommunications service providers, interne service providers (ISP), application service providers (ASP), or government entities. An organization can become a peering partner, for example, through providing information to the peering grid. Such information, in some examples, can include organization name, phone number, address, billing address or method (e.g., deposit account, etc.), one or more phone numbers, and one or more network addresses, each network address correlating to one or more of the phone numbers. A peering partner, for example, can register telephone numbers with the peering infrastructure 102 along with routing information, such as the interne protocol (IP) address of a peering partner edge routing device or other address which allows access to telecommunications devices assigned to the peering partner. In some implementations, individuals can also register broadband network-based telecommunications devices, such as a softphone, with the peering infrastructure 102. The registered telephone numbers can be stored within the peering database 104. In some implementations, the peering database 104 is included within the peering infrastructure 102.

The peering infrastructure 102, in some implementations, can include routing logic 114 and a switch 116. In other implementations, the routing logic 114 can be included within the switch 116. In one example, the peering infrastructure 102 can include a Softswitch or virtual PBX which is operable to perform various communication tasks over a packet-switched network, such as dialing endpoints, bridging call legs and facilitating Integrated Voice Response (IVR) exchanges. Other implementations are possible. In simplified terms, the routing logic 114 computes a path for reaching the destination requested within a call offer and the switch 116 performs the switching maneuver necessary to move the call offer along towards its destination. For example, the switch 116 can include logic for translating between a first telecommunications protocol and a second telecommunications protocol.

When a call offer destined for a telephone number registered by a peering partner is received by the peering infrastructure 102, the peering infrastructure 102 looks up the destination telephone number in the peering database 104 and routes the call offer to the associated address. The peering infrastructure 102 collects call detail records regarding the termination of the call offer. The collected call detail records can be used in determining payment owed to the peering partner.

According to an example illustrated in FIG. 1, a public telecommunications network (e.g., the public switched telephone network (PSTN)) can issue (122) a call offer to the peering infrastructure 102. The switch 116 within the peering infrastructure 102, for example receives the call offer. The switch 116 can communicate the destination telephone number to the routing logic 114. The routing logic 114 can perform (124) a database query, locating information regarding the telephone number within the peering database 104. If the telephone number does not exist within the peering database 104, the routing logic 114 can perform a standard routing operation of the call offer. For example, the peering infrastructure 102 can route the call over the lowest cost route to the destination.

If, instead, the telephone number is discovered within the peering database 104, the routing logic 114 can provide the destination address of the peering partner telecommunications equipment (e.g., an edge switch of the peering partner grid 106) to the switch 116. The switch 116 can route (126) the call offer directly to the peering partner grid 106. In some implementations, the call offer is routed over a broadband trunk established between the peering infrastructure 102 and the peering partner grid 106. In other implementations, the switch 116 contains another style of hard-coded connection between the peering infrastructure 102 and the peering partner grid 106. This connection, for example, can be established when the peering partner registers (120) telephone numbers with the peering infrastructure 102. The peering partner grid 106 delivers (128) the call offer to a destination communications device 118.

Upon completion of the call received by the peering partner grid 106, the switch 116 provides (130) call details in the form of a call detail record (CDR) to one or more CDR collectors 108. The call detail records, in some examples, can include the originating telephone number, the receiving telephone number, an origination timestamp, and the call duration. The CDR collectors 108, in some implementations, enrich each call detail record with information pertaining to the routing of the call offer directly to the peering partner. In some examples, this information can include identification of the peering partner associated with the destination telephone number, identification of the peering partner associated with the originating telephone number, or the calling rate (e.g., per minute charge or flat rate connection charge) associated with routing the call offer through the standard telecommunications routing mechanisms, such as using the least cost routing (LCR) path. In other implementations, the switch 116 enriches each call detail record, or provides the CDR collectors 108 with the information needed to enrich the call detail records. The CDR collectors 108, in some implementations, archive the enriched call detail records.

The CDR collectors 108 provide (132) the enriched call detail records to a call summarization engine 110 which calculates summarized usage information per peering partner on a scheduled basis (e.g., monthly, bi-weekly, weekly, etc.). In some examples, the summarized usage information can include the total minutes routed through a direct peering connection, the total number of calls terminated by the peering infrastructure 102 on behalf of the peering partner, or a total potential cost of the peering infrastructure 102 having routed the summarized call offers through the standard telecommunications routing mechanisms.

The call summarization engine 110, in some implementations, generates a summarized termination usage report for each peering partner. The call summarization engine 110 can deliver (134) the termination usage reports to each peering partner (e.g., fax, email, postal service, uploaded to a web-based account, etc.), for example, on a scheduled basis.

The call summarization engine 110 can also provide (136) summarized call record data to an invoicing and payment engine 112 which computes a payment due to the peering partner based, in part, upon the summarized call record data. In some implementations, the invoicing and payment engine 112 calculates a percentage rate based upon the total potential cost of the peering infrastructure 102 having routed the summarized call offers through the standard telecommunications routing mechanisms or a percentage rate based upon the rate paid by the originating telecommunications exchange (e.g., the PSTN) to the peering infrastructure 102 for termination services. In other implementations, the invoicing and payment engine 112 can calculate a flat rate per call or a flat rate per call minute directly routed from the peering infrastructure 102 to the peering partner grid 106.

The invoicing and payment engine 112, in some implementations, can manage the delivery (138) of payment to the peering partner. In some examples, the invoicing and payment engine 112 can coordinate the issuance of a check to the peering partner or can credit an account that the peering partner has with the peering provider. The termination usage reports, in some implementations, can be combined with the payment and issued as a single communication to the peering partner.

Example Invoicing and Payment Process

Figure 2:
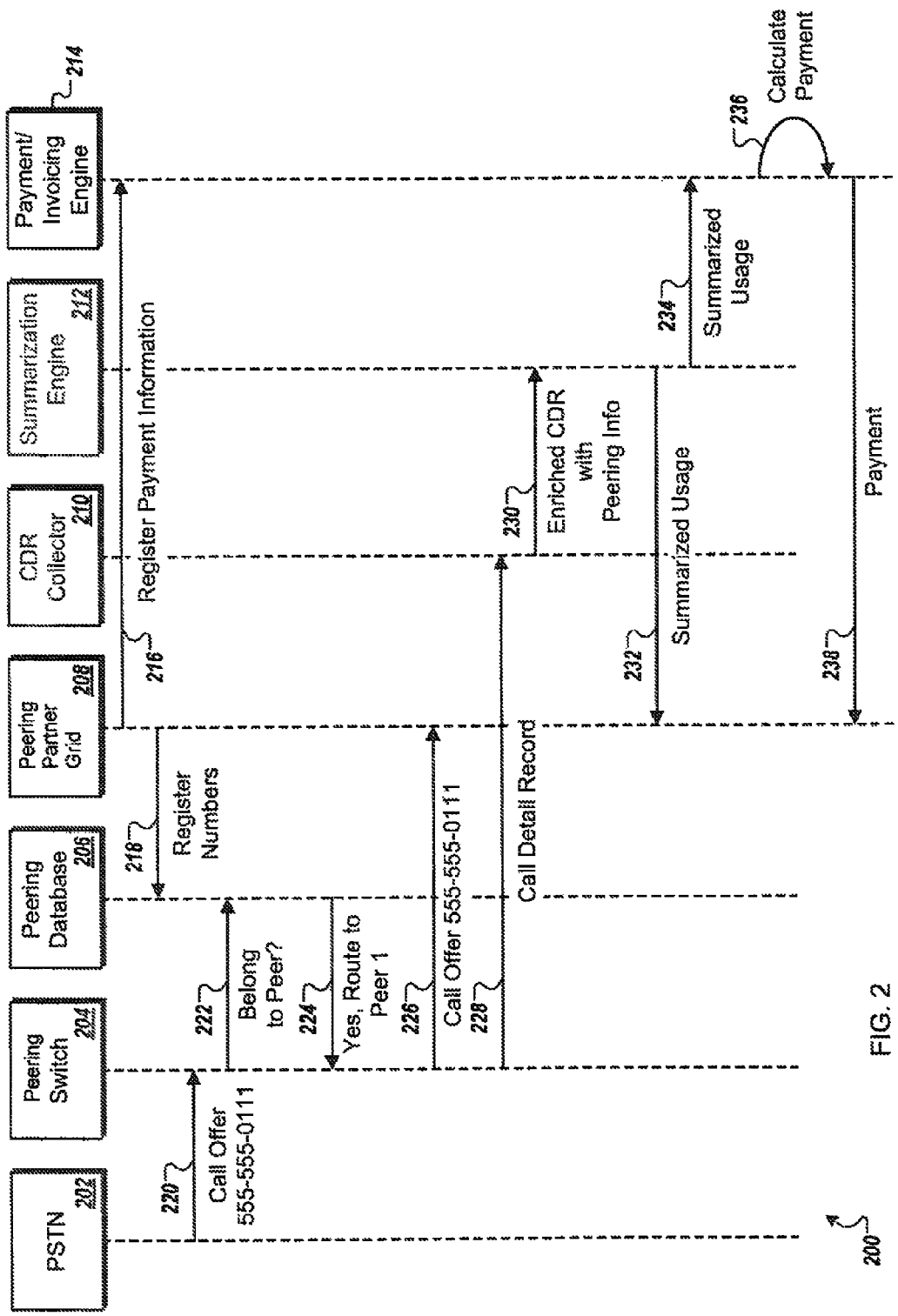
FIG. 2 is a swim lane diagram of an example process for performing call connection invoicing and generating payment information for peering partners within a telecommunications peering grid.

FIG. 2 is a swim lane diagram of an example process 200 for performing call connection invoicing and generating payment information for peering partners within a telecommunications peering grid. The telecommunications peering grid, for example, can route call offers directly to each peering partner, manage call termination handling for each call offer routed directly to a peering partner, and issue payments to each peering partner which reflect the direct routing of one or more call offers to the peering partner from the telecommunications peering grid.

In some implementations, the process 200 includes a public telecommunications network 202, a peering switch 204, a peering database 206, a peering partner grid 208, a call detail record collector 210, a summarization engine 212, and a payment and invoicing engine 214.

The process 200 begins with the peering partner grid 208 establishing a membership or account as a peering partner with the telecommunications peering grid. In some examples, the peering partner can provide registration information to the peering partner grid via telephone, email, a web-based membership form, or issuing a paper membership form through the postal service or facsimile.

The registration process, in some implementations, includes registering payment information (216) with the payment and invoicing engine 214. For example, the peering partner grid 208 can provide a billing address, direct deposit account routing number, and/or other information to the payment and invoicing engine 214 for receiving payments from the telecommunications peering grid. Along with registering a method for receiving payments, in some implementations, the peering partner selects from a number of available invoicing options. For example, the telecommunications peering grid can provide each peering partner with a variety of invoicing summarization options and/or payment calculation options.

The registration process also includes registering one or more telephone numbers (218) with the peering database 206. In some implementations, the peering partner grid 208 provides the peering database 206 with one or more blocks of telephone numbers as well as a routing address associated with each block. In one example, the peering partner may include a corporate organization with a home office location and a satellite office location. The peering partner can register a first block of telephone numbers, 555-555-0xxx, as being associated with a first IP address and a second block of telephone numbers, 333-333-0xxx, as being associated with a second IP address, each block being geographically registered with a different office. Other implementations are possible.

At a later point in time, the peering switch 204 receives a call offer for telephone number 555-555-0111 (220) from the public telecommunications network 202. In some implementations, the public telecommunications network 202 is a PSTN. The public telecommunications network 202, in one example, can transfer the call offer to the peering grid for termination, agreeing to pay a call termination fee to the peering grid for terminating the call offer.

The peering switch 204 queries (222) the peering database 206 to determine if the telephone number 555-555-0111 has been registered by a peering partner. If the telephone number 555-555-0111 is not located within the peering database 206, for example, the peering switch 204 can route the call offer over a standard telecommunications network.

The peering database 206 responds (224) with a record for the telephone number 555-555-0111. The record, in some implementations, includes a direct routing address for the telephone number, such as an IP address. In other implementations, the record includes an identification of a direct routing connection established between the telecommunications peering grid and the peering partner grid, such as a switching trunk coded into the switch 116 (as described in relation to FIG. 1).

The peering switch 204 routes (226) the call offer for the telephone number 555-555-0111 to the peering partner grid 208. In this example, the call offer terminates as a connected call. A connected call, in some examples, includes the circumstances of a busy signal, a direct to voice mail, or an established data/voice communications transfer.

The peering switch 204, in some implementations, collects data regarding the call connection upon termination within a call detail record. The call detail record, in some examples, includes an originating telephone number, a destination telephone number, a timestamp, and a call duration. The call detail record, in some implementations, additionally includes information regarding the peering partner such as an identification code or connecting IP address. The switch 204 provides (228) the call detail record to the call detail record (CDR) collector 210.

The CDR collector 210 archives call detail records. In some implementations, the CDR collector 210 stores call detail records within a local database for archival. In other implementations, the CDR collector 210 uploads call detail records to a database, such as a networked database, on a per call or batch basis. For example, two or more CDR collectors 210 can publish call detail records to a shared CDR archival system. If the call detail record pertains to a call which the peering grid directly connected to a peering partner, the CDR collector 210, in some implementations, enriches the call detail record with information regarding the peering partner. For example, using the termination telephone number, the CDR collector 210 can match the call detail record to a peering partner identification code. In some implementations, the CDR collector 210 queries the peering database 206 to obtain peering partner information associated with the termination telephone number. In other implementations, the CDR collector 210 queries a separate database including peering partner information (e.g., a database including payment and invoicing registration information, or another database maintained by the peering partner grid).

The CDR collector 210 provides (230) the enriched call detail record to the summarization engine 212. For example, the CDR collector 210, after having collected records within a local database system, can publish one or more call detail records within a call detail record archiving system. The CDR collector 210, in another example, can provide the summarization engine 212 with information regarding the retrieval of one or more call detail records from a call detail record archiving system. In some implementations, the summarization engine 212 receives enriched call detail records from two or more CDR collectors 210.

The summarization engine 212 summarizes the peering partner's usage of the telecommunications peering grid. In some examples, the summarization engine 212 can calculate the total call offer terminations for the peering partner over a period of time, total call minutes directly routed from the peering switch 204 to the peering partner grid 208, total call minutes per registered telephone number, total call offer terminations per telephone number, total call minutes per registered peering partner termination address, or total call offer terminations per registered peering partner termination address.

The data being summarized, in some implementations, can depend in part upon the type of payment and invoicing agreement established between the telecommunications peering grid and the peering partner. For example, the peering partner can request greater or fewer details from the peering partner grid within each invoice report, ranging from a total number of calls/total number of minutes per billing cycle to an individual detailed call log. The summarization engine 212, in some implementations, provides (232) the summarized invoice report to the peering partner grid 208.

The summarization engine 212 also provides (234) summarized usage to the payment and invoicing engine. In some implementations, the peering partner can select between different payment styles, such as per call rates versus per minute rates. The summarization engine 212 can generate a portion of the data needed by the payment and invoicing engine 214 based upon payment style. In other implementations, the summarization engine 212 provides the same type statistics to the payment and invoicing engine 214 regardless of the peering partner.

The payment and invoicing engine 214 calculates (236) a payment for the peering partner based, in part, upon the data provided by the summarization engine 212. In some implementations, the payment and invoicing engine 214 queries a database to determine the payment style and/or payment delivery method selected by the peering partner grid 208 (e.g., during registration). The payment style, in some examples, can include a percentage rate based upon the total potential cost of the telecommunications peering grid having routed each of the summarized call offers through the standard telecommunications routing mechanisms rather than via a direct route to the peering partner grid 208, a percentage rate based upon the call termination fee paid by the originating telecommunications exchange (e.g., the PSTN) to the telecommunications peering grid for termination services, a flat rate per call directly routed between the telecommunications peering grid and the peering partner grid 208, or a flat rate per call minute directly routed from the telecommunications peering grid to the peering partner grid 208.

In an embodiment, a variable cost compensation scheme is provided. The variable compensation payment scheme allows for sharing market value of call traffic between the peering switch 204 and a terminating carrier, such as the peering partner grid 208. When the summarization engine 212 summarizes the usage of the peering partner grid 208 (i.e., the terminating carrier) of the telecommunications peering grid (i.e., the peering switch 204), the summarization engine 212 or the payment and invoicing engine 214 may determine a market value of call traffic to the peering partner grid 208 over a predetermined time period. The predetermined time period may be, for example, a one-month billing cycle, although any desired time period may be used. The market value may be based on revenue for terminations of the call traffic from the peering switch 204 to the peering partner grid 208. For example, the market value may be a sum of the revenue collected for terminations of the call traffic to the peering partner grid 208, where the revenue collected is from customers initiating call traffic to the peering switch 204.

The summarization engine 212 or the payment and invoicing engine 214 may determine a variable cost of the call traffic for the predetermined time period. The variable cost may be a function of sharing the market value between the peering switch 204 and the peering partner grid 208. For example, the market value may be equally shared so that the variable cost is one-half or 50% of the market value. Other proportions may be used depending on various criteria, such as but not limited to an agreement between the peering switch 204 and the peering partner grid 208 that specifies or otherwise indicates a predetermined percentage or amount.

With the determination of the variable cost of the call traffic, the summarization engine 212 or the payment and invoicing engine 214 may determine a compensation amount due to the peering partner grid 208 as a function of the variable cost. With this information, a report is created that includes one or more of the determined market value, the determined variable cost, and the determined compensation amount.

According to an embodiment, the market value of the call traffic and the variable cost of the call traffic may be a function of a total amount of time of the call traffic for the predetermined time period. Thus, for example, the market value may be computed as the collected revenue divided by the total amount of minutes of the call traffic for the predetermined time period. The variable cost may then accordingly be represented as the variable cost per minute, and the compensation amount due to the peering partner grid 208 may be determined as the variable cost per minute times the total amount of minutes of the call traffic.

In other implementations, rather than calculating a payment, the payment and invoicing engine 214 calculates a credit amount to apply to the account of the peering partner grid 208. In one example, the telecommunications peering grid can charge the peering partner grid 208 for routing call offers originating from the peering partner grid 208 and credit the peering grid 208 for routing call offers terminating at the peering grid 208. The peering partner grid 208, for example, can be paid an overage or billed for the difference between the origination-based debits and the destination-based credits. If the peering partner grid 208 is a telecommunications carrier or telecommunications service provider, for example, the payment calculated by the payment and invoicing engine 214 can be applied to an overall reciprocal billing model established between the peering provider and the peering partner provider.

In some implementations, the payment and invoicing engine 214 distributes (238) a payment to the peering partner grid 208. For example, the payment and invoicing engine 214, based upon the payment information previously registered by the peering partner grid 208, can deliver an electronic or check-based payment to the destination chosen by the peering partner. If the summarization engine 212 did not provide a summarized usage report directly to the peering partner grid 208 previously, the payment and invoicing engine 214, in some implementations, can include the summarized usage report in the payment delivery.

In other implementations, the payment and invoicing engine 214 can provide the payment information to an accounting system within the telecommunications peering grid, for example, to apply a debit or credit to the peering partner account.

Although the summarization engine 212 and the payment and invoicing engine 214 are illustrated as separate entities, in other implementations, the capabilities of the summarization engine 212 can be combined with the capabilities of the payment and invoicing engine 214. In other implementations, the payment and invoicing engine 214 can be included within a greater accounting engine.

Example System Architecture

Figure 3:
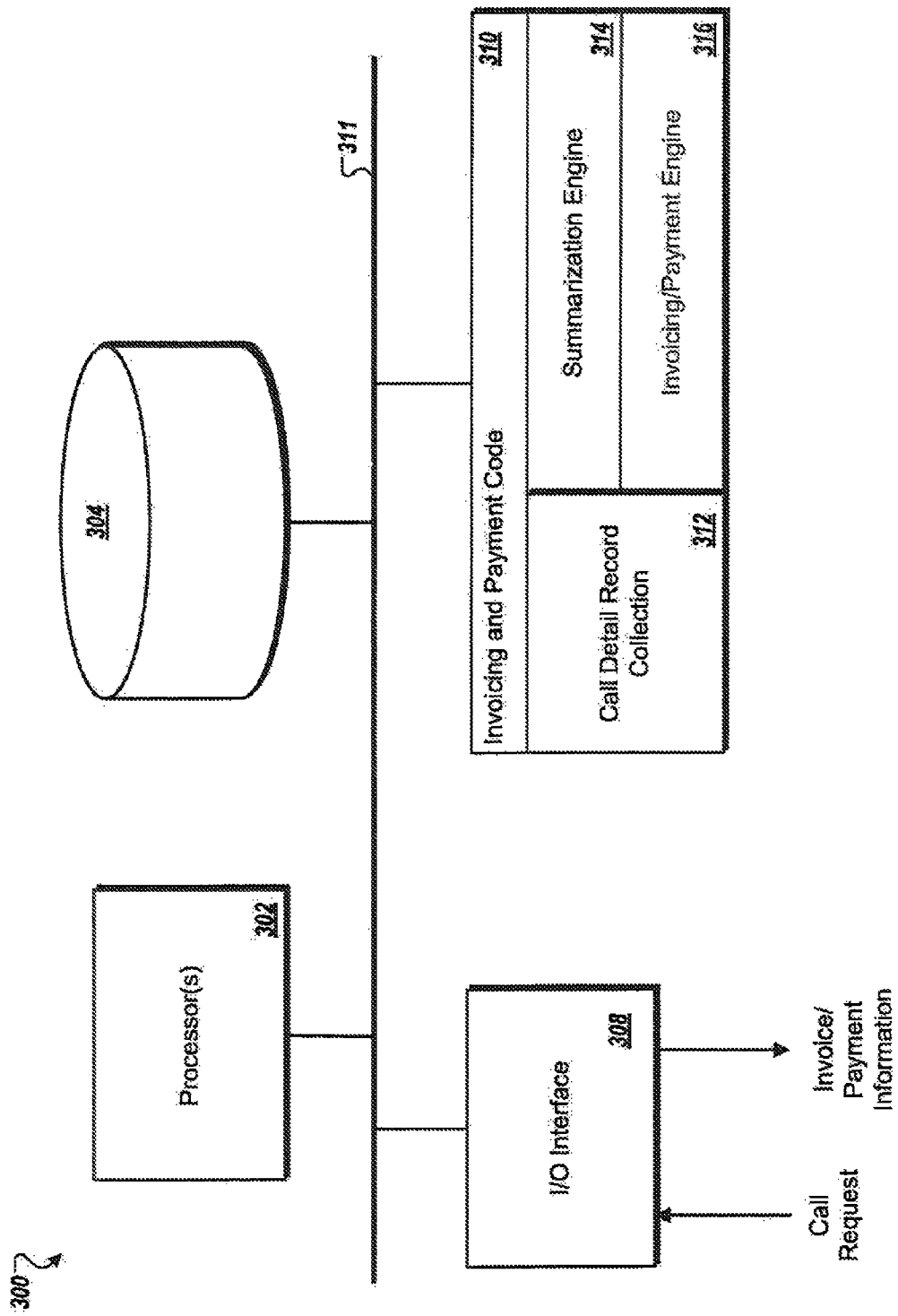
FIG. 3 is a block diagram of an example system architecture for performing the various operations described in reference to FIGS. 1-2.

FIG. 3 is a block diagram of an example system architecture 300 for performing the various operations described in reference to FIGS. 1-2. For example, the system 300 may be included in the peering infrastructure 102, described in reference to FIG. 1. The system 300 includes one or more processors 302, a memory 310, a storage device 304, and an input/output interface 308. Each of these components can be interconnected using a system bus 311. The processor 302 is capable of processing instructions for execution within the system 300. In some implementations, the processor 302 is a single-threaded processor. In other implementations, the processor 302 is a multi-threaded processor. The processor 302 is capable of processing instructions stored in the memory 310 or on the storage device 304 to perform the operations described in reference to FIGS. 1-2.

The memory 310 stores information within the system 300. In some implementations, the memory 310 is a computer-readable medium. In other implementations, the memory 310 is a volatile memory unit. In yet other implementations, the memory 310 is a non-volatile memory unit. In the example shown, the memory 310 includes call detail record (CDR) collection code 312 for collecting and enriching call detail records, summarization engine code 314 for generating summarized statistics and invoicing reports for individual peering partners of a telecommunications peering grid, and invoicing and payment engine code 316 for calculating and applying payments or account credits for individual peering partners based, in part, upon call detail record summary statistics. Details regarding the operations of the CDR collection code 312, summarization engine code 314, and invoicing and payment engine code 316 are described in reference to FIGS. 1-2. The storage device 304 is capable of providing mass storage for the system 300. In some implementations, the storage device 304 is a computer-readable medium. In various different implementations, the storage device 304 may be implemented as one or more floppy disk devices, hard disk devices, optical disk devices, or tape devices. For example, the peering database 104 as described in relation to FIG. 1 or a call detail record archiving system as described in relation to FIG. 2 can be implemented within the storage device 304.

The input/output interface 308 provides an interface for input/output operations for the system 300. In some implementations, the input/output interface 308 can be coupled to a keyboard and/or pointing device. In other implementations, the input/output interface 308 can be coupled to a display unit for displaying graphical user interfaces.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The invention claimed is:

1. A method of generating a call detail record for a terminating carrier, wherein the terminating carrier terminates call traffic received from a peering grid, the method comprising:
   determining a market value of call traffic to a terminating carrier over a predetermined time period, wherein the market value is based on revenue for terminations of the call traffic from a peering gird to the terminating carrier;
   determining a variable cost of the call traffic, wherein the variable cost is a function of sharing the market value between the peering grid and the terminating carrier;
   determining a compensation amount due to the terminating carrier as a function of the variable cost; and
   creating a report comprising one or more of the determined market value, the determined variable cost, or the determined compensation amount;
   wherein each of the determining operations and the creating operation are performed by a processing element capable of communicating with the peering grid.

2. The method of claim 1, further comprising transmitting the report to the terminating carrier by one of the processing element or the peering grid.

3. The method of claim 1, further comprising issuing a payment in the amount of the determined compensation amount to the terminating carrier by one of the processing element or the peering grid.

4. The method of claim 1, further comprising applying a payment in the amount of the determined compensation amount to an account associated with the terminating carrier by one of the processing element or the peering grid.

5. The method of claim 1, wherein determining a market value of call traffic comprises summing the revenue collected for terminations of the call traffic from the peering grid to the terminating carrier, wherein the revenue collected is from customers initiating call traffic to the peering grid.

6. The method of claim 1, wherein determining a variable cost of the call traffic comprises calculating a percentage of the market value of the call traffic, wherein the percentage is a predetermined amount specified by one or more of the terminating carrier or the peering grid.

7. The method of claim 1, wherein each of the market value of the call traffic and the variable cost of the call traffic are a function of a total amount of time of the call traffic for the predetermined time period.

8. The method of claim 1, wherein the processing element is a component of the peering grid.

* * * * *